(12) United States Patent
Grimm et al.

(10) Patent No.: US 9,897,983 B2
(45) Date of Patent: Feb. 20, 2018

(54) CONTROL OF A MACHINE USING RELAXED ABDUCTION METHOD

(75) Inventors: Stephan Grimm, München (DE); Thomas Hubauer, München (DE); Mikhail Roshchin, Feldkirchen (DE); Holger Stender, Nürnberg (DE); Stuart Watson, Newark (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 822 days.

(21) Appl. No.: 14/353,039

(22) PCT Filed: Oct. 28, 2011

(86) PCT No.: PCT/EP2011/069048
§ 371 (c)(1),
(2), (4) Date: Jun. 2, 2014

(87) PCT Pub. No.: WO2013/060389
PCT Pub. Date: May 2, 2013

(65) Prior Publication Data
US 2014/0277755 A1 Sep. 18, 2014

(51) Int. Cl.
*G05B 15/00* (2006.01)
*G05D 23/00* (2006.01)
(Continued)

(52) U.S. Cl.
CPC ........ *G05B 13/04* (2013.01); *G05B 13/0265* (2013.01); *G05B 23/0278* (2013.01)

(58) Field of Classification Search
CPC . G05B 13/04; G05B 13/0265; G05B 23/0278
(Continued)

(56) References Cited

U.S. PATENT DOCUMENTS 5,692,106 A * 11/1997 Towers ................. G06N 5/043
706/45
6,012,152 A * 1/2000 Douik ................ G06F 11/0709
714/26
(Continued)

FOREIGN PATENT DOCUMENTS

WO     2011131617 A2    10/2011

OTHER PUBLICATIONS

Hubauer et al., Automata-Based Abduction for Tractable Diagnosis, Proceedings of the 23$^{rd}$ Internatinoal Workshop on Description Logics, 2010, pp. 360-363.*
(Continued)

*Primary Examiner* — Ziaul Karim
(74) *Attorney, Agent, or Firm* — Beusse Wolter Sanks & Maire

(57) ABSTRACT

A method and apparatus for actuating a machine is provided in which a relaxed abduction problem is determined in order to explain the greatest possible part of the observations with the fewest possible assumptions. Based upon two preference orders over a subset of observations and a subset of assumptions, tuples are determined so that the theory together with the subset of assumptions explains the subset of observations. On the basis of the formal validity of the approach certain characteristics of the set of results (such as correctness, completeness, etc.) are checked. By the choice of underlying representational language and the preference relations, the complexity of the problem-solving process is influenced and thus flexibly adapted with regard to domain requirements. The invention may be used for any machines, e.g. gas turbines or steam turbines.

12 Claims, 2 Drawing Sheets

```
1  foreach r ∈ N_R do
2  |  R(r) ← ∅;
3  foreach C ∈ N_C^⊤ do
4  |  S(C) ← {⊤ : {(∅,∅)}, C : {(∅,∅)}};
   // propagation
5  repeat
6  |  changed ← false;
7  |  foreach a ∈ T ∪ A do
   |  |  // (...)
8  |  |  if a = ∃r.A_2 ⊑ B then // CR4
9  |  |  |  foreach A_1 ∈ N_C^⊤ s.t. S(A_1) ∋ A_2 : L_{A_1,A_2} do
10 |  |  |  |  foreach A ∈ N_C^⊤ s.t. R(r) ∋ (A,A_1) : L_{A,r,A_1} do
11 |  |  |  |  |  L ← ∅;
12 |  |  |  |  |  if S(A) ∋ B : L_{A,B} then L ← L_{A,B};
13 |  |  |  |  |  L* ← join(L, meet(L_{A_1,A_2}, L_{A,r,A_1}, a, A ⊑ B));
14 |  |  |  |  |  if L* ≠ L then
15 |  |  |  |  |  |  S(A) ← (S(A) \ {B : L_{A,B}}) ∪ {B : L*};
16 |  |  |  |  |  |  changed ← true;
   |  |  // (...)
17 until changed = false;
```

(51) Int. Cl.
*G05B 13/04* (2006.01)
*G05B 13/02* (2006.01)
*G05B 23/02* (2006.01)

(58) Field of Classification Search
USPC .......................................................... 700/275
See application file for complete search history.

(56) References Cited

U.S. PATENT DOCUMENTS

| | | | |
|---|---|---|---|
| 2007/0288405 | A1 | 12/2007 | Menich |
| 2007/0288418 | A1* | 12/2007 | Pope ...................... G06N 7/005 706/53 |
| 2008/0123533 | A1* | 5/2008 | Vasseur ................... H04L 45/00 370/238 |
| 2009/0018802 | A1* | 1/2009 | de Kleer ................ G06F 17/504 703/2 |
| 2010/0083056 | A1 | 4/2010 | Mills |
| 2014/0297578 | A1* | 10/2014 | Roshchin ........... G05B 23/0251 706/46 |

OTHER PUBLICATIONS

Pino-Perez et al. "preferences and explanations" Jul. 2002.*
Eiter et al., Abduction and the Dualization Problem, 2003, International Conference on Discovery Science.*
Lecue F. et al; "Applying Abduction in Semantic Web Service Composition"; Web Services, 2007. ICWS 2007, IEEE, PI; pp. 94-101; ISBN: 978-0-7695-2924-0; XP031119904; 2007; Jul. 1, 2007.

* cited by examiner

FIG 1

```
1  foreach r ∈ N_R do
2  |  R(r) ← ∅;
3  foreach C ∈ N_C^⊤ do
4  |  S(C) ← {⊤ : {(∅, ∅)}, C : {(∅, ∅)}};

// propagation
5  repeat
6  |  changed ← false;
7  |  foreach a ∈ T ∪ A do
      |  // (...)
8     |  if a = ∃r.A_2 ⊑ B then  // CR4
9        |  foreach A_1 ∈ N_C^⊤ s.t. S(A_1) ∋ A_2 : L_{A_1,A_2} do
10          |  foreach A ∈ N_C^⊤ s.t. R(r) ∋ (A, A_1) : L_{A,r,A_1} do
11             |  L ← ∅;
12             |  if S(A) ∋ B : L_{A,B} then  L ← L_{A,B};
13             |  L* ← join(L, meet(L_{A_1,A_2}, L_{A,r,A_1}, a, A ⊑ B));
14             |  if L* ≠ L then
15                |  S(A) ← (S(A) \ {B : L_{A,B}}) ∪ {B : L*};
16                |  changed ← true;
      |  // (...)
17 until changed = false;
```

CONTROL OF A MACHINE USING RELAXED ABDUCTION METHOD

CROSS REFERENCE TO RELATED APPLICATIONS

This application is the US National Stage of International Application No. PCT/EP2011/069048 filed Oct. 28, 2011, and claims the benefit thereof, and is incorporated by reference herein in its entirety.

FIELD OF INVENTION

The invention relates to a method and an apparatus for actuating a machine, particularly a gas or steam turbine.

BACKGROUND OF INVENTION

Steam and gas turbines are complex technical systems that have a multiplicity of (e.g. several hundred) sensors, each of which possibly provides a plurality of measured values per second.

For the purpose of monitoring and controlling the turbine, the data obtained from the sensors are processed, analyzed and interpreted. It is thus possible to identify deviations from a prescribed normal state as early as possible and if need be to prevent damage to and/or failure of the turbine.

In this case, the volume of data and the complexity of possible dependencies between the data are usually far too great for effective analysis of the data by an operating person to be possible.

Model-based information interpretation (and the application thereof within the framework of model-based diagnosis) is becoming increasingly important. In this context, model-based methods have the advantage of an explicit and comprehensible description of the domain (e.g. of the technical system requiring a diagnosis). Such an explicit model can be examined and understood, which promotes acceptance by the user, particularly in respect of a diagnosis or an interpretation result. In addition, the models can be customized for new machines, extended by new domain knowledge and, depending on the type of presentation, even checked for correctness with reasonable effort. It is also possible to use a vocabulary of the model for man-machine interaction and hence for implementing an interactive interpretation process.

In the case of a logic-based representation of the domain model, the interpretation process is frequently implemented by means of what is known as (logic-based) abduction. This is an attempt to explain the observed information (such as sensor measurements and results from preprocessing processes) by using a formal model. In this context, allowance is made for the fact that the set of observations (e.g. owing to measurement inaccuracies, absence of sensors, etc.) is often incomplete by being able to assume missing information during an explanatory process. In formal terms, the object is thus to determine, for a given model T (also called the "theory") and a set of observations O, a set A of assumptions (usually as a subset $\underline{A} \subseteq A$ from all possible assumptions A) such that the observations O are explained by the model T and also the assumptions $\underline{A} \subseteq A$. In this case, the problem is worded as an optimization problem, i.e. the "best" such set $\underline{A} \subseteq A$ of assumptions is sought (according to the optimality criterion, e.g. the smallest set, or the set with the lowest weight).

In the practice of automatic information interpretation and/or diagnosis, there is—besides the problem of missing observations—also the problem that observations exist that cannot be explained with the given model. Typical causes of this are, by way of example, faulty sensors that deliver measured values outside an envisaged range, or else incomplete models that do not take account of at least one arising combination of observations. Such problems clearly restrict the practical usability of abduction-based information interpretation.

SUMMARY OF INVENTION

An object of the invention is to avoid the disadvantages cited above and to allow an opportunity for abduction even in the case of erroneous observations.

This object is achieved according to the features of the independent claims. Preferred embodiments are revealed particularly by the dependent claims.

The object is achieved by proposing a method for actuating a technical system, particularly a machine,—in which a relaxed abduction problem is determined,—in which the relaxed abduction problem is solved and the technical system is actuated as appropriate.

The present approach allows an interactive diagnosis of different data, with the diagnosis being based on a model of the turbine, for example. In this case, it is possible to compensate at least to some extent for absent observations and/or erroneous models. Hence, potential errors can be predicted before they occur. Furthermore, it is possible for the operation of the technical system to be ensured despite erroneous models.

Within the context of the relaxed abduction proposed here, it is possible to make efficient use of an incomplete model of a turbine, in particular. This is significant primarily when the model is adapted on a step-by-step basis so as to achieve improved mapping of the real turbine and/or to react to changes in the physical circumstances, e.g. when the turbine itself is altered.

In this respect, a diagnostic model is proposed that comprises observations (e.g. observable features) for portions of the turbine, these portions being able to have an effect on the diagnosis of the whole turbine. The model can be created from the start or it is possible for based models, existent (design) data or the like to be taken into account for creating the model. The information or data that are taken into account for model creation may be available or noted down, for example in UML (unified modeling language) or another domain-specific language.

In particular, it is possible to use different axioms for describing the model, with complex relationships also being able to be expressed by means of temporal and/or spatial dependencies. This is explained in detail below.

The solution presented here uses the approach of relaxed abduction for diagnosis for machines, particularly turbines (e.g. steam or gas turbines). This approach allows a large number of instances of application for real machines, the modeling of which has a high level of complexity.

The use of representation or description languages allows relational structures to be sensed and rendered amenable to automatic evaluation. A particular advantage is that it is possible to use an incomplete and possibly also erroneous model. In particular, erroneous and incomplete information can result in a particular diagnosis. Implementation can be effected in different description languages.

In this context, it should be noted that the actuation may relate to or comprise control, diagnosis or other processing of data from the technical system. In particular, the actuation in this case also comprises diagnosis, for example pertaining to the use of the information during a maintenance interval.

As a result of the wording as a multicriterion optimization problem, there is no longer the need to offset assumptions made and observations explained against one another.

The presented approach is highly generic, i.e. it does not require any assumptions about the preference relations used besides the intuitive stipulation that the addition of a further assumption (in the case of an unaltered observation set) cannot improve the preference and the addition of an explained observation (in the case of an unaltered assumption set) cannot impair the preference.

On account of the formal soundness of the approach, it is possible for particular properties of the result set (such as correctness, completeness, etc.) to be checked and substantiated, which is advantageous particularly in safety-critical applications.

Using the choice of underlying representational language and of preference relations, it is possible for the complexity of the problem solving process to be influenced and thus customized to any domain requirements.

One embodiment includes the machine comprising a turbine, particularly a gas turbine or a steam turbine.

One development is that two orders of preference over a subset of the observations and a subset of the assumptions are taken as a basis for determining tuples, so that the theory together with the subset of the assumptions explains the subset of the observations.

This formalizes the intuitive approach of explaining the largest possible portion of observations seen with as few assumptions as possible; in this case, optimality corresponds to pareto-optimality for the two orders of preference (since maximization of the observations and minimization of the assumptions are opposite or different aims). A solution to the problem comprises pareto-optimal pairs (A,O).

The general definition—based on general orders—of the optimality allows the use of various optimality terms, for example minimum and/or maximum number of elements, subset and/or superset relationship, or minimum and/or maximum sum of the weights of the elements contained.

Another development is that the relaxed abduction problem is determined to be RAP=(T, A, O, $\leq_A$, $\leq_O$) wherein
the theory T,
a set of abducible axioms A,
a set O of observations,
with
T∪O and
the orders of preference
$\leq_A \subseteq P(A) \times P(A)$ and
$\leq_O \subseteq P(O) \times P(O)$
are taken as a basis for determining ≤—minimal tuples (A,O)∈P(A)×P(O), so that T∪A is consistent and T∪A|=O holds.

In this case, the order ≤ is based on the orders $\leq_A$ and $\leq_O$ as follows:
(A,O)≃(A',O') ↔ A≃$_A$A'∧O≃$_O$O'
(A,O)<(A',O') ↔ (A≤$_A$A'∧O<$_O$O')∨(A<$_A$A'∧O≤$_O$O')
(A,O)≤(A',O') ↔ ((A,O)<(A',O'))∨((A,O)≃(A',O'))

Hence, it is proposed that incorrect and missing information are two complementary facets of defective information and are therefore handled in the same way. In addition to the prerequisite that a required piece of information is based on a set of the assumptions A (also referred to as: abducibles or abducible axioms), the relaxed abduction ignores observations from the set O during production of hypotheses if required.

Accordingly, a good solution has a high level of significance for the observations while being based on assumptions as little as possible. Therefore, advantageously, the order $\leq_A$ is chosen to be monotone and the order $\leq_O$ is chosen to be anti-monotone for subset relationships.

In particular, it is a development that the relaxed abduction problem is solved by transforming the relaxed abduction problem into a hypergraph, so that tuples (A,O) are encoded by pareto-optimal paths in the hypergraph.

It is also a development that the pareto-optimal paths are determined by means of a label approach.

In addition, it is a development that hyperedges of the hypergraph are induced by transcriptions of prescribed rules.

A subsequent development is that the prescribed rules are determined as follows:

$$\frac{A \sqsubseteq A_1}{A \sqsubseteq B}[A_1 \sqsubseteq B \in \mathcal{T}] \quad \text{(CR1)}$$

$$\frac{A \sqsubseteq A_1 \quad A \sqsubseteq A_2}{A \sqsubseteq B}[A_1 \sqcap A_2 \sqsubseteq B \in \mathcal{T}] \quad \text{(CR2)}$$

$$\frac{A \sqsubseteq A_1|}{A \sqsubseteq \exists r \cdot B}[A_1 \sqsubseteq \exists r \cdot B \in \mathcal{T}] \quad \text{(CR3)}$$

$$\frac{A \sqsubseteq \exists r \cdot A_1 \quad A_1 \sqsubseteq A_2}{A \sqsubseteq B}[\exists r \cdot A_2 \sqsubseteq B \in \mathcal{T}] \quad \text{(CR4)}$$

$$\frac{A \sqsubseteq \exists r_1 \cdot B}{A \sqsubseteq \exists s \cdot B}[r_1 \sqsubseteq s \in \mathcal{T}] \quad \text{(CR5)}$$

$$\frac{A \sqsubseteq \exists r_1 \cdot A_1 \quad A_1 \sqsubseteq \exists r_2 \cdot B}{A \sqsubseteq \exists s \cdot B}[r_1 \circ r_2 \sqsubseteq s \in \mathcal{T}]. \quad \text{(CR6)}$$

One embodiment is that a weighted hypergraph $H_{RAP}=$ (V,E) that is induced by the relaxed abduction problem is determined by $$V = \{(\underline{A} \sqsubseteq B), (A \sqsubseteq \exists r \cdot B) \mid A, B \in N_C^T, r \in N_R\},$$

wherein $$V_T = \{(A, A), (A, T) \mid A \in N_C^T\} \subseteq V$$

denotes a set of final states and E denotes a set of the hyperedges
e=(T(e), h(e), w(e)),
so that the following holds: there is an axiom a∈T∪A that justifies the derivation h(e)∈V from T(e) ⊆ V on the basis of one of the prescribed rules, wherein the edge weight w(e) is determined according to $$A = \begin{cases} \{a\} & \text{if } a \in A, \\ \emptyset & \text{otherwise} \end{cases},$$

$$O = \begin{cases} \{h(e)\} & \text{if } h(e) \in O, \\ \emptyset & \text{otherwise} \end{cases}$$

An alternative embodiment is that $p_{X,t}=(V_{X,t},E_{X,t})$ is determined as a hyperpath in H=(V,E) from X to t if
(1) t∈X and $p_{X,t}$=({t},∅) or
(2) there is an edge e∈E, so that
h(e)=t,T(e)={y$_1$, . . . , y$_k$} holds.

In this case, $p_{X,y_i}$, are hyperpaths from X to $y_i$:

$$V \supseteq V_{X,t} = \{t\} \cup \bigcup_{y_i \in T(e)} V_{X,y_i},$$

$$E \supseteq E_{X,t} = \{e\} \cup \bigcup_{y_i \in T(e)} E_{X,y_i},$$

A subsequent embodiment is that shortest hyperpaths are determined by taking account of two preferences.

It is also an embodiment that the shortest hyperpaths are determined by taking account of two preferences by means of a label correction algorithm.

One development is that the labels encode pareto-optimal paths to the hitherto found nodes of the hypergraph.

An additional embodiment is that alterations along the hyperedges are propagated by means of a meet operator and/or by means of a join operator.

Another embodiment is that the relaxed abduction problem is determined by means of a piece of description logic.

The above object is also achieved by means of an apparatus for actuating a machine comprising a processing unit that is set up such that—a relaxed abduction problem can be determined,—the relaxed abduction problem can be solved and the machine can be actuated as appropriate.

The processing unit may, in particular, be a processor unit and/or an at least partially hardwired or logic circuit arrangement that, by way of example, is set up such that the method as described herein can be carried out. Said processing unit may be or comprise any type of processor or computer having correspondingly necessary peripherals (memory, input/output interfaces, input/output devices, etc).

The explanations above relating to the method apply to the apparatus accordingly. The apparatus may be embodied in one component or in distributed fashion in a plurality of components. In particular, it is also possible for a portion of the apparatus to be linked via a network interface (e.g. the Internet).

In addition, the object is achieved by proposing a system or a computer network comprising at least one of the apparatuses described here.

The solution presented herein also comprises a computer program product that can be loaded directly into a memory of a digital computer, comprising program code portions that are suitable for carrying out steps of the method described herein.

In addition, the aforementioned problem is solved by means of a computer-readable storage medium, e.g. an arbitrary memory, comprising instructions (e.g. in the form of program code) that can be executed by a computer and that are suited to the computer carrying out steps of the method described here.

The properties, features and advantages of this invention that are described above and also the manner in which they are achieved will become clearer and more distinctly comprehensible in connection with the schematic description of exemplary embodiments that follows, these being explained in more detail in connection with the drawings. In this case, elements that are the same or that have the same action may be provided with the same reference symbols for the sake of clarity.

BRIEF DESCRIPTION OF THE DRAWINGS

In the drawings:

FIG. 1 shows a schematic illustration of an algorithm in pseudo-code notation to provide an exemplary explanation of the propagation of the labels on the basis of rule (CR4);

DETAILED DESCRIPTION OF INVENTION

Figure 2:
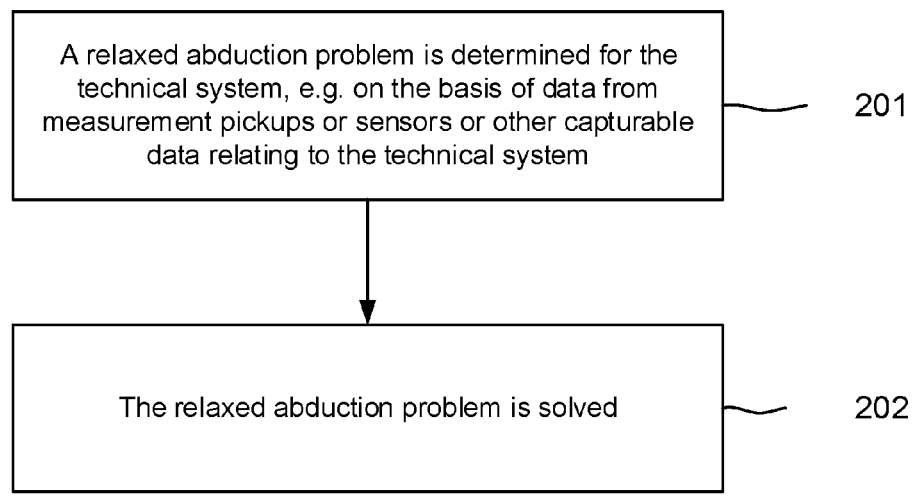
FIG. 2 shows a schematic block diagram with steps of the method proposed herein.

The solution proposed here comprises particularly the following:

(1) The definition of the logic-based abduction is formally relaxed so as to obtain important properties of defined problems (such as the verifiability of statements about correctness and existence of solutions, etc).

In particular, a relaxed abduction problem (see below: definition 3) is determined. On the basis of two orders of preference over sets of observations or assumptions, "optimal" pairs (also referred to as tuples) (A,O) (with $A \subset \mathcal{A}$, $O \subset \mathcal{O}$) are now intended to be determined, so that the theory T together with the set of assumptions $A \subset \mathcal{A}$ explains the observations $O \subset \mathcal{O}$, formally: $T \cup A \models O$.

This formalizes the intuitive approach of explaining the largest possible portion of the observations seen with as few assumptions as possible; in this case, optimality corresponds to pareto-optimality for the two orders of preference (since maximization of the observations and minimization of the assumptions are opposite or different aims). A solution to the problem comprises all pareto-optimal pairs (A,O).

The general definition—based on general orders—of the optimality allows the use of various optimality terms, for example minimum and/or maximum number of elements, subset and/or superset relationship, or minimum and/or maximum sum of the weights of the elements contained.

(2) In addition, it is proposed that the specified relaxed abduction problem be solved in a suitable manner. In this context, the relaxed abduction problem is translated into a hypergraph such that optimal pairs (A,O) are encoded by pareto-optimal paths in the induced hypergraph.

The optimum paths are determined by using a label approach.

Taken together, these two steps allow solutions to an interpretation problem to be found even when it is not possible to explain all observations.

Overall, the field of application of model-based information interpretation (and hence also of model-based diagnosis) is significantly extended by the approach proposed here, since it is now also possible to process situations with an abundance of observation data (or a defectively formulated model). In this case, the demonstrated solution is conservative, i.e. in cases in which a conventional method delivers a solution, a corresponding solution is also provided by the approach proposed here.

Relaxed abduction with a solution is described in detail below.

Although abductive reasoning over principles of description logic knowledge is applied successfully to various information interpretation processes, it cannot provide adequate (or even any) results if it is confronted by incorrect information or incomplete models. The relaxed abduction proposed here solves this problem by ignoring incorrect information, for example. This can be done automatically on the basis of joint optimization of the sets of explained observations and required assumptions. By way of example, a method is presented that solves the relaxed abduction over εL+ TBoxes based on the notion of shortest hyperpaths with multiple criteria.

Abduction was introduced in the late 19th century by Charles Sanders Pierce as an inference scheme aimed at deriving potential explanations for a particular observation. The rule formulated in this context $$\frac{\phi \supset \omega \quad \omega}{\phi}$$

can be understood as an inversion of the modus ponens rule that allows $\phi$ to be derived as a hypothetical explanation for the occurrence of $\omega$, under the assumption that the presence of $\phi$ in some sense justifies $\omega$.

This general formulation cannot presuppose any causality between $\phi$ and $\omega$ in this case. Various notions of how $\phi$ justifies the presence of $\omega$ give rise to different notions of abductive inference, such as what is known as a set-cover-based approach, logic-based approaches or a knowledge-level approach.

In particular, the present case deals with logic-based abduction over $\delta L^+$ TBoxes. Correspondingly, other logic-based presentation schemes are also possible.

On account of its hypothetical nature, an abduction problem does not have a single solution but rather has a collection of alternative answers $A_1, A_2, \ldots, A_k$, from among which optimal solutions are selected by means of an order of preference "$\leq$". The expression $$A_i \leq A_j$$

denotes that $A_i$ is "not worse" that "$A_j$", with an indifference $$A_i \leq A_j \wedge A_j \leq A_i \text{ where } A_i \simeq A_j$$

and a strict preference $$A_i \leq A_j \wedge A_j \neq A_i \text{ where } A_i \prec A_j$$

being determined. It is then possible for a (normal) preference-based abduction problem to be defined as follows:

Definition 1: Preference-Based Abduction Problem $$PAP = (T, A, O, \leq_A)$$

In view of a set of axioms T, referred as the "theory", a set of abducible axioms A, a set O of axioms that represent observations, so that T|≠O holds, and a (not necessarily total) order relationship $$\leq_A \subseteq P(A) \times P(A),$$

all $\leq_A$ minimal sets $\hat{A} \subseteq A$ are determined, so that T∪$\hat{A}$ is consistent and T∪$\hat{A}$|=O holds.

Typical orders of preference over sets are or comprise subset minimality, $$A_i \leq^s A_j \leftrightarrow A_i \subseteq A_j$$

minimal cardinality $$A_i \leq^c A_j \leftrightarrow |A_i| \leq |A_j|$$

or
weighting-based orders, which are defined by a function $\omega$ which assigns numerical weights to subsets of A $$A_i \leq^w A_j \leftrightarrow w(A_i) \leq w(A_j).$$

The first two orders of preference give preference to a set A over any of its subsets; this monotonicity property is formalized in definition 2 below.

Definition 2: Monotone and Anti-Monotone Order

An order $\leq(<)$ over sets is monotone (strictly monotone) for a subset relationship if $S' \subseteq S$ implies $S' \leq S$ (or $S' \subset S$ implies $S' < S$).

Conversely, an order $\leq(<)$ is anti-monotone (strictly anti-monotone) for a subset relationship if $S' \supseteq S$ implies $S' \leq S$ ($S' \supset S$ implies $S' < S$).

Applications of abductive information interpretation using a formal domain model include media interpretation and diagnostics for complex technical systems such as production machines. These domains have many, in some cases simple, observations on account of a large number of sensors, whereas the model for all of these observations is often inadequately or incompletely specified. The following example illustrates how the classical definition of abduction can fail in a specific situation:

Example: Sensitivity to Incorrect Information

A production system comprises a diagnosis unit, wherein the production system has been mapped using a model. The model indicates that a fluctuating supply of current is manifested by intermittent failures in a main control unit, while the communication links remain operational and a mechanical gripper in the production system is unaffected (the observations are deemed to be modeled as a causal consequence of the diagnosis).

It is now assumed that a new additional vibration sensor observes low-frequency vibrations in the system. If the diagnostic model has not yet been extended in respect of this vibration sensor, which means that the observations of the vibration sensor also cannot be taken into account, the low-frequency vibrations delivered by the vibration sensor will unsettle the diagnostic process and prevent effective diagnosis in relation to the supply of current, even though the data delivered by the vibration sensor could actually be totally irrelevant.

Hence, the extension of the system by the vibration sensor results in the diagnosis no longer working reliably.

This flaw is based—according to the above definition of the preferred abduction problem—on the need for an admissible solution to have to explain every single observation $o_i \in O$. This severely restricts the practical applicability of logic-based abduction to real industry applications in which an ever greater number of sensor data items produce and provide information that is not (yet) taken into account by the model.

An extension of logic-based abduction is therefore proposed below, so that even a wealth of data provide the desired results, e.g. diagnoses, flexibly and correctly.

Relaxed Abduction

Whereas, for simple models, it is still possible for incorrect information to be identified and possibly removed in a preprocessing step with a reasonable amount of effort, this is not possible for many real and correspondingly complex models, also because the relevance of a piece of information is dependent on the interpretation thereof and hence is not known in advance.

Hence, it is proposed that incorrect and missing information are two complementary facets of defective information and are therefore handled in the same way. In addition to the prerequisite that a required piece of information is based on the set of the assumptions A (also referred to as: abducibles or abducible axioms), the relaxed abduction ignores observations from the set O during production of hypotheses if required. This is formalized in definition 3.

Definition 3: Relaxed Abduction Problem $$\mathcal{RAP} = (\mathcal{T}, \mathcal{A}, O, \leq_\mathcal{A}, \leq_O)$$

On the basis of a set of axioms T, referred to as the "theory", a set of abducible axioms A, a set O of axioms that represent observations, so that T|≠O holds, and two (not necessarily total) order relationships $\leq_A \subseteq P(A) \times P(A)$ and $\leq_O \subseteq P(O) \times P(O)$, all ≤-minimal tuples $(A, O) \in P(A) \times P(O)$ are determined, so that T∪A is consistent and T∪A|=O holds.

In this case, the order ≤ is based on the orders $\leq_A$ and $\leq_O$ as follows:

$(A,O) \simeq (A',O') \leftrightarrow A \simeq_A A' \cap O \simeq_O O'$ $(A,O) < (A',O') \leftrightarrow (A \leq_A A' \cap O <_O O') \vee (A <_A A' \cap O \leq_O O')$ $(A,O) \leq (A',O') \leftrightarrow ((A,O) < (A',O')) \vee ((A,O) \simeq (A',O'))$ Accordingly, a good solution has a high level of significance for the observations while being based on assumptions as little as possible. Therefore, advantageously, the order $\leq_A$ is chosen to be monotone and the order $\leq_O$ is chosen to be anti-monotone for subset relationships.

Using inclusion as an order criterion over sets, the following will hold:

$A \leq_A A' \leftrightarrow A \subseteq A'$ and $O \leq_O O' \leftrightarrow O \supseteq O'$.

For the example cited above with the augmented vibration sensor, a minimal solution that explains all observations apart from the vibrations is obtained on the basis of the order. Therefore, this vibration is not taken into account in the diagnosis, which allows the fluctuating supply of current to be indicated as the result of the diagnosis.

Assertion 1: Conservativeness:

$A \subseteq A$ is a solution for the preference-based abduction problem $$\mathcal{PAP} = (\mathcal{T}, \mathcal{A}, O, \leq_\mathcal{A})$$

if (A,O) is a solution to the relaxed abduction problem $$\mathcal{RAP} = (\mathcal{T}, \mathcal{A}, O, \leq_\mathcal{A}, \leq_O),$$

specifically for any order ≤O, which is anti-monotone for the subset relationship.

Evidence:

It is assumed that A solves the preferred abduction problem $$\mathcal{PAP} = (\mathcal{T}, \mathcal{A}, O, \leq_\mathcal{A}).$$

The following then holds:
T∪A is consistent
T∪A|=O and
A is $\leq_A$-minimal.
Since the order ≤O for the subset relationship is anti-monotone, O is also $\leq_O$-minimal; (A,O) is therefore ≤-minimal and hence solves the relaxed abduction problem RAP.

Conversely, the following holds: if (A,O) solves the relaxed abduction problem RAP, then the following holds:
T∪A is consistent
T∪A|=O and
(A,O) is ≤-minimal.
If it is assumed that $A \leq_A A'$ holds, so that it follows that: $A \subseteq A'$, T∪A' is consistent and T∪A'|=O, then it holds that:

$$(A', O) < (A, O),$$

which is inconsistent with the ≤-minimality of (A,O).

Conservativeness states that under ordinary circumstances relaxed abduction provides all solutions (provided that there are some) to the corresponding standard abduction problem (i.e. the nonrelaxed abduction problem). Since the $\leq_A$-order and the $\leq_O$-order are typically competing optimization aims, it is expedient to treat relaxed abduction as an optimization problem with two criteria. ≤-Minimal solutions then correspond to pareto-optimal points in the space of all combinations (A,O) that meet the logical requirements of a solution (consistency and explanation of the observations).

Assertion 2: Pareto-Optimality of RAP:

Let $$\mathcal{RAP} = (\mathcal{T}, \mathcal{A}, O, \leq_\mathcal{A}, \leq_O)$$

be a relaxed abduction problem. (A*,O*) is a solution to the relaxed abduction problem RAP if it is a pareto-optimal element (on the basis of the orders $\leq_A$ and $\leq_O$) in the solution space $$\{(A, O) \in \mathcal{P}(\mathcal{A}) \times \mathcal{P}(O) \mid \mathcal{T} \cup A \models O \wedge \mathcal{T} \cup A \not\models \bot\}.$$

Evidence:

If $(A^*, O^*)$ solves the relaxed abduction problem RAP, then it holds that:
T∪A* is consistent and
T∪A*⊨O*.
$(A^*, O^*)$ is therefore an element of the explanation space (ES); in addition, $(A^*, O^*)$ is ≤-minimal.

It is now assumed that $(A^*, O^*)$ is not pareto-optimal for ES, and also that $(A', O') \in ES$, so that (without loss of generality) $A' <_A A^*$ and $O' \leq_O O^*$ hold.

This would result in $$(A', O') \prec (A^*, O^*)$$

which would be inconsistent with ≤-minimality of $(A^*, O^*)$. Hence, $(A^*, O^*)$ is a pareto-optimal element of the explanation space ES.

Similarly, $(A', O')$ is a pareto-optimal element of the explanation space ES. In order to show that the tuple is ≤-minimal, let $(A^*, O^*)$ be a solution to a relaxed abduction problem RAP, so that the following holds:

$$(A', O') \prec (A^*, O^*).$$

Without loss of generality, this gives $A^* <_A A'$ and $O^* \leq_O O'$, which is inconsistent with the pareto-optimality of $(A', O')$. Therefore, $(A', O')$ must be ≤-minimal and hence solves the relaxed abduction problem RAP.

The next section provides an approach in order to solve a relaxed abduction. This approach is based on the simultaneous optimization of $\leq_A$ and $\leq_O$.

Solving Relaxed Abduction

The description logic $\epsilon L^+$ is a member of the $\epsilon L$ family, for which a subsumption can be verified in PTIME. $\epsilon L^+$ concept descriptions are defined by $$C ::= T \mid A \mid C \sqcap C \mid \exists r \cdot C$$

(where $A \in N_C$ is a concept name and $r \in N_R$ is a role name). $\epsilon L^+$ axioms are
concept inclusion axioms C⊓D or
role inclusion axioms $$r_1 \circ \ldots \circ r_k \sqsubseteq r$$

with C, D concept descriptions;

$$r, r_1, \ldots, r_k \in N_R, k \geq 1.$$

In this case, $N_C$ denotes the set of concept names and $N_R$ denotes the set of role names.

Since any $\epsilon L^+$ TBox can be normalized with only a linear increase in magnitude, it holds that all axioms have one of the following (normal) forms:

$$A_1 \sqsubseteq B \quad \text{(NF1)}$$

$$A_1 \sqcap A_2 \sqsubseteq B \quad \text{(NF2)}$$

$$A_1 \sqsubseteq \exists r \cdot B \quad \text{(NF3)}$$

$$\exists r \cdot A_2 \sqsubseteq B \quad \text{(NF4)}$$

$$r_1 \sqsubseteq s \quad \text{(NF5)}$$

$$r_1 \circ r_2 \sqsubseteq s \quad \text{(NF6)}$$

for $A_1, A_2 B \in N_C^T = N_C \cup \{T\}$ and $r_1, r_2 s \in N_R$.

Accordingly, (NF1) describes a concept inclusion "all objects in a class $A_1$ are also objects in a class B". (NF2) describes: "if an object belongs to class $A_1$ and to class $A_2$ then it also belongs to class B". This can be shortened to "$A_1$ and $A_2$ are implied by B". (NF3) denotes: "if an object belongs to class $A_1$ then it is linked to at least one object in class B via a relation r". Accordingly, (NF4) describes: "if an object is linked to at least one object in class $A_2$ by means of a relation r then said object belongs to class B". The normal forms (NF5) and (NF6) are obtained accordingly for the roles $r_1, r_2, s \in N_R$.

In addition to standard refutation-based table reasoning, $\epsilon L$ the family allows a completion-based reasoning scheme that explicitly derives valid subsumptions, specifically using a set of rules in the style of Gentzen's sequent calculus (also called "Gentzen calculus").

The rules (completion rules CR and initialization rules IR) are presented below:

$$\frac{A \sqsubseteq A_1}{A \sqsubseteq B} [A_1 \sqsubseteq B \in \mathcal{T}] \quad \text{(CR1)}$$

$$\frac{A \sqsubseteq A_1 \quad A \sqsubseteq A_2}{A \sqsubseteq B} [A_1 \sqcap A_2 \sqsubseteq B \in \mathcal{T}] \quad \text{(CR2)}$$

$$\frac{A \sqsubseteq A_1}{A \sqsubseteq \exists r \cdot B} [A_1 \sqsubseteq \exists r \cdot B \in \mathcal{T}] \quad \text{(CR3)}$$

$$\frac{A \sqsubseteq \exists r \cdot A_1 \quad A_1 \sqsubseteq A_2}{A \sqsubseteq B} [\exists r \cdot A_2 \sqsubseteq B \in \mathcal{T}] \quad \text{(CR4)}$$

$$\frac{A \sqsubseteq \exists r_1 \cdot B}{A \sqsubseteq \exists s \cdot B} [r_1 \sqsubseteq s \in \mathcal{T}] \quad \text{(CR5)}$$

$$\frac{A \sqsubseteq \exists r_1 \cdot A_1 \quad A_1 \sqsubseteq \exists r_2 \cdot B}{A \sqsubseteq \exists s \cdot B} [r_1 \circ r_2 \sqsubseteq s \in \mathcal{T}] \quad \text{(CR6)}$$

$$\overline{A \sqsubseteq A} \quad \text{(IR1)}$$

$$\overline{A \sqsubseteq T} \quad \text{(IR2)}$$

A graph structure which is produced using the rules allows subsumptions to be derived.

By way of example, it is assumed that both the set of assumptions A and the set of observations O, like the theory T, are axioms of the description logic.

The axiom-oriented representation allows a high level of flexibility and reuse of information.

From Completion Rules to Hypergraphs

Since the rules shown above are a complete evidence system for $\epsilon L^+$, any normalized axiom set can accordingly be mapped as a hypergraph (or as an appropriate representation of such a hypergraph), the nodes of which are axioms of type (NF1) and (NF3) over the concepts and the role names that are used in the axiom set (in line with all statements that are admissible as a premise or conclusion in a derivation step).

Hyperedges of the hypergraph are induced by transpositions of the rules (CR1) to (CR6); by way of example, an instantiation of the rule (CR4), which derives $C \sqsubseteq F$ from $C \sqsubseteq \exists r \cdot D$ and $D \sqsubseteq E$ using the axiom $\exists r \cdot E \sqsubseteq F$, induces a hyperedge $$\{C \sqsubseteq \exists r \cdot D, D \sqsubseteq E\} \rightarrow C \sqsubseteq F.$$

This correspondence can also be extended to relaxed abduction problems as follows: Both T and A contain arbitrary $\epsilon L^+$ axioms in normal form that can justify individual derivation steps represented by a hyperedge (in order to simplify the representation, it can be assumed that $A \cap T = \emptyset$ holds).

Elements from the set of all observations O, on the other hand, represent information that is to be justified (i.e. that is derived), and therefore correspond to nodes of the hypergraph. This requires axioms from O to be only of type (NF1) and (NF3); this is a restriction that is usable in practice, since (NF2) axioms and (NF4) axioms can be converted into an (NF1) axiom, specifically using a new concept name, and since role inclusion axioms are not needed in order to express observations about domain objects. Preferably, the hyperedges are provided with a label on the basis of this criterion. This is also evident from the definition below.

Definition 4: Induced Hypergraphs $H_{RAP}$.
Let $$\mathcal{RAP} = (\mathcal{T}, \mathcal{A}, O, \preceq_\mathcal{A}, \preceq_O)$$

be a relaxed abduction problem. A weighted hypergraph $H_{RAP} = (V, E)$, which is induced by RAP, is defined by $$V = \{(A \sqsubseteq B), (A \sqsubseteq \exists r \cdot B) \mid A, B \in N_C^T, r \in N_R\},$$

wherein $$V_T = \{(A, A), (A, T) \mid A \in N_C^T\} \subseteq V$$

denotes the set of final states and E denotes the set of all hyperedges
$e = (T(e), h(e), w(e))$,
so that the following holds:
There is an axiom $a \in T \cup A$ that justifies the derivation $h(e) \in V$ from $T(e) \subseteq V$ on the basis of one of the rules (CR1) to (CR6). The edge weight $w(e)$ is defined by $$A = \begin{cases} \{a\} & \text{if } a \in A, \\ \emptyset & \text{otherwise} \end{cases},$$

$$O = \begin{cases} \{h(e)\} & \text{if } h(e) \in O, \\ \emptyset & \text{otherwise} \end{cases}$$

In this context, it should be noted that the magnitude of $H_{RAP}$ is bounded polynomially in $|N_C|$ and $|N_R|$. Checking whether a concept inclusion $D \sqsubseteq E$ ($C \sqsubseteq \exists r \cdot D$) can be derived also checks whether the graph contains a hyperpath from $V_T$ to the node $D \sqsubseteq E$ ($C \sqsubseteq \exists r \cdot D$)).

Intuitively, there is a hyperpath from X to t if there is a hyperedge that connects a particular set of nodes Y to t, and each $y_i \in Y$ can be reached from X via a hyperpath. This is formalized using the definition below.

Definition 5: Hyperpath:
$p_{X,t} = (V_{X,t}, E_{X,t})$ is a hyperpath in $H = (V, E)$ from X to t if
(1) $t \in X$ and $p_{X,t} = (\{t\}, \emptyset)$ or
(2) there is an edge $e \in E$, so that $$h(e) = t, T(e) = \{v_1, \ldots, y_k\}$$

holds.
In this case $p_{X,y_i}$ are hyperpaths from X to $y_i$ $$V \supseteq V_{X,t} = \{t\} \cup \bigcup_{y_i \in T(e)} V_{X,y_i},$$

$$E \supseteq E_{X,t} = \{e\} \cup \bigcup_{y_i \in T(e)} E_{X,y_i},$$

Hyperpath Search for Relaxed Abduction

This section provides an exemplary explanation of an algorithm for solving the relaxed abduction problem RAP. This involves determining the shortest hyperpaths by taking into account two different criteria (multi-aim optimization).

Thus, an extended label correction algorithm for finding shortest paths using two criteria in a graph is proposed on the basis of [Skriver, A. J. V.: A classification of bicriterion shortest path (bsp) algorithms. Asia-Pacific Journal of Operational Research 17, pages 199-212 (2000)]. Thus, the graph is presented in a compact form using two lists S and R (see also: Baader, F., Brandt, S., Lutz, C.: Pushing the EL envelope. In: Proceedings of the $19^{th}$ International Joint Conference on Artificial Intelligence. Pages 364-369 (2005)). The entries in the list are extended by labels that encode the pareto-optimal paths to the previously found node. Alterations are propagated along the weighted edges using—a meet operator ($\otimes$ operator) and—a join operator ($\oplus$ operator).

In this case, the meet operator is defined as follows:

---

Function: meet ($L_1$, $L_2$, just concl)
Input parameters: $L_1$ Label set
  $L_2$ Label set
  just Axiom in normal form
  concl Axiom in normal form
Output parameter: Label set for the meet operator $\otimes$
Result $\leftarrow \{A_1 \cup A_2, O_1 \cup O_3) | (A_1, O_1) \in L_1, (A_2, O_2) \in L_2\}$;
if just $\in$ A then result $\leftarrow \{(A \cup \{just\}, O) | (A, O) \in result\}$;
if concl $\in$ O then result $\leftarrow \{(A, O) \cup \{concl\}) | (A, O) \in result\}$;
return result;

---

The join operator can be defined as follows:

---

Function: join ($L_1$, $L_2$)
Input parameters $L_1$ Label set
  $L_2$ Label set
Output parameter Label set for the join operator $\oplus$
result $\leftarrow L_1 \cup L_2$;
result $\leftarrow$ remove-dominated (result $\preceq_A, \preceq_O$);
return result;

---

In this context, it should be noted that the "remove_dominated" functionality removes those labels that code relatively poor paths.

When saturation has been reached, the labels of all $\preceq$-minimal paths in $H_{RAP}$ are collected in the set
$MP(H_{RAP}) := \cup_{v \in V} label(v)$.

FIG. 1 shows a schematic illustration of an algorithm in pseudo code notation for the exemplary explanation of the propagation of the labels on the basis of the rule (CR4).

As already explained, the algorithm shown in FIG. 1 is used to produce the labels for the hyperpath of the relaxed abduction problem. In lines 1 to 4, initialization takes place and in the subsequent lines of the code fragment shown, the labels are assigned and alterations to the labels are propagated.

In line 7, all axioms a from T and A are selected in order and for each of these axioms a check is performed to determine whether the individual rules (CR1) to (CR6) apply. This is shown by way of example from line 8 onward for the rule (CR4). If need be, a new label L* is added in line 13 and a check is performed in line 14 to determine whether the label has been changed. If this is the case, the previous label entry is removed in line 15. Accordingly, the labels are added or updated.

In line 17, a check is performed to determine whether saturation has occurred, i.e. no further change is needed to be taken into account.

In this context, it should be noted that even though the order of propagations is irrelevant to correct ascertainment, it can have a significant effect on the number of candidates produced: finding almost optimal solutions may already result in a large number of less-than-optimal solutions in good time, which can be rejected. To improve performance, it is thus possible to use heuristics by first of all exhaustively applying propagations that are determined by elements of T and introducing assumptions only if such propagations are not possible.

Assertion 3: Correctness:

The set of all solutions for a relaxed abduction problem $$\mathcal{RAP} = (\mathcal{T}, \mathcal{A}, \mathcal{O}, \leq_{\mathcal{A}}, \leq_{\mathcal{O}})$$

is indicated by a $\leq$-minimal closure of $MP(H_{RAP})$ under component-wise union as per $$(A, O) \uplus (A', O') := (A \cup A', O \cup O').$$

Evidence:

Hyperpaths in $H_{RAP}$ that begin at $V_T$ are derivations. Labels that are constructed on the basis of these hyperpaths can be used in order to encode relevant information that is used during this derivation. According to assertion 2, it is sufficient to show that the proposed algorithm correctly determines the labels for all pareto-optimal paths in $H_{RAP}$ that begin at $V_T$.

This can be verified inductively on the basis of the correctness of the meet and join operators. This closing synopsis of $\cup_{v \in V}$label(v) as a component-wise union is based on the insight that, since the two statements a and b have been verified, it is evidently possible to verify a^b by combining the two items of evidence using the meet operator. In graphical terms, this can be regarded as addition of the associated node T, so that any other $v \in V$ is connected to the node T by means of a hyperedge ({v}, T, {$\emptyset,\emptyset$}). The label for this node then encodes all solutions to the relaxed abduction problem, and is calculated as indicated above.

Since the node labels can grow exponentially with the magnitude A and O, it is worthwhile, for general orders of preference such as the set inclusion, considering the advantage of the present method in comparison with a brute force approach: iteration is performed over all pairs $$(A, O) \in \mathcal{P}(\mathcal{A}) \times \mathcal{P}(\mathcal{O}),$$

and all tuples (A,O) are collected, so that $T \cup A \models O$ holds; finally, all $\leq$-dominant tuples are eliminated. This approach requires $2^{|A|+|O|}$ deducibility tests, with each set that passes this test being tested for $\leq$-minimality. The solution presented is superior to a brute force approach in several respects:

a) in contrast to the uninformed brute force search outlined above, the approach proposed in this paper realizes an informed search as it does not generate all possible (A,O) pairs at random but rather only those for which the property $T \cup A \models O$ actually holds, without requiring any additional deducibility tests. The overall benefit of this property is dependent on the model of T and on the sets A and O. Problems that have only a few solutions therefore benefit most from the present proposal.

b) Dropping $\leq$-dominated labels for $\leq_A$ and $\leq_O$, which are (anti-)monotone for set inclusion, reduces the worst case magnitude of node labels by at least a factor $O(\sqrt{|A| \cdot |O|})$.

c) In addition to the upper limits for the magnitude of labels, it is also possible for the expected number of non-dominated paths to a state to be determined as follows: two arbitrary orders over elements of A and O are assumed, so that any subset can be encoded directly as a binary vector of length |A| or |O|. For this, it is possible to deduce that the labels grow on average only in the order of magnitude $1.5^{|A|+|O|}$ instead of $2^{|A|+|O|}$.

Other selections for $\leq_A$ and $\leq_O$ can lead to more considerable savings of computation effort, since the orders of preference are used as a pruning criterion while the solution is generated. This allows the present approach to be used for approximation.

If, by way of example, the assumption set and the observation set are compared not by means of set inclusion but rather by means of cardinality, the maximum label magnitude is decreased to $|A| \cdot |O|$. This could—depending on the order of the rule application—not result in optimal solutions, however.

In a more complex design, e.g. for an installation or a technical system, it is possible to allocate numerical weights for observations and/or abducible axioms so that only such solutions as are substantially poorer than others are dropped. Alternatively, it is possible to use weights (or scores) in order to calculate limits for a maximum number of points that can be achieved by a partial solution; this number of points can be used as pruning criterion.

Hence, the present approach provides an opportunity for relaxed abduction for a description logic. Relaxed abduction extends logic-based abduction by the option of interpreting incorrect information for incomplete models. A solution to relaxed abduction over $\epsilon L^+$ knowledge bases is presented on the basis of pareto-optimal hyperpaths in the derivation graph. The performance of this approach also has critical advantages over that of mere enumeration despite the inherent exponential growth of node labels.

The proposed algorithm can accordingly be applied to other description logics for which it is possible to determine subsumption by means of completion. This is the case for the $\epsilon L^{++}$ description logic, for example.

The relaxed abduction described in the present case allows various specializations that are obtained from various selection options for $\leq_A$ and $\leq_O$. By way of example, approximated solutions can be generated very efficiently (i.e. with a linear label magnitude) if set cardinality is used as a dominance criterion. It is also possible for the axioms to have weights allocated in order to allow early or even lossless pruning of less-than-optimum partial solutions; in this case, the label magnitudes are also reduced.

FIG. 2 shows a schematic block diagram with steps of the method proposed herein: In a step 201, a relaxed abduction problem is determined for the technical system, e.g. on the basis of data from measurement pickups or sensors or other capturable data relating to the technical system. In a step 202, the relaxed abduction problem is solved.

The technical system may be a technical installation, assembly, process monitoring, a power station or the like.

Figure 3:
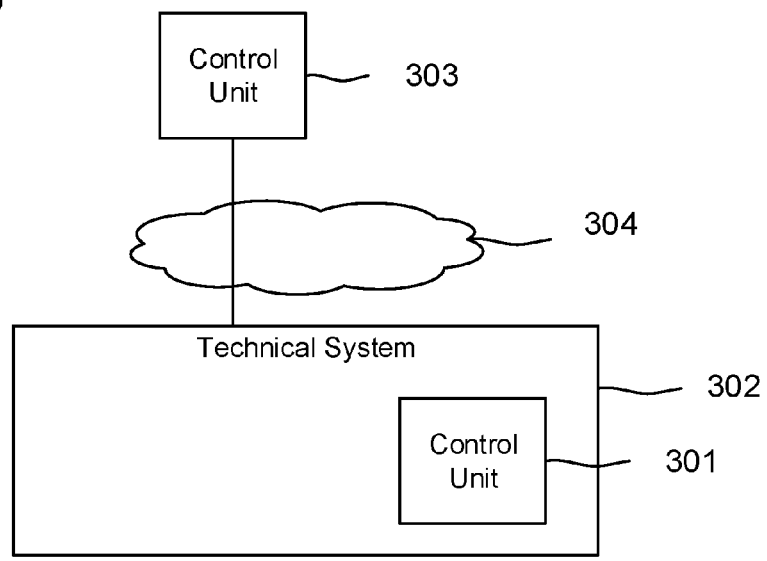
FIG. 3 shows a schematic block diagram with control units for actuating a technical installation.

FIG. 3 shows a schematic block diagram with a control unit 301 that is arranged by way of example within a technical installation 302. In addition, a control unit 303 is provided, which is arranged separately from the technical installation 302 and is connected thereto via a network 304, for example the Internet. Both control units 301, 303 can be used in order to actuate the technical system 302; in particular, it is possible for at least one of the control units 301, 303 to carry out diagnosis for the technical system 302 and/or to set parameters for the technical system 302.

The technical system is a machine that comprises particularly at least one gas turbine and/or at least one steam turbine. The technical system may also comprise a plurality of turbines and, if need be, be provided centrally for diagnosis for a plurality of such turbines.

Although the invention has been illustrated and described in more detail using the at least one exemplary embodiment shown, the invention is not restricted thereto and other variations can be derived therefrom by a person skilled in the art without departing from the scope of protection of the invention.

The invention claimed is:

1. A method for actuating a machine, comprising:
determining, by a processing unit, a solution using relaxed abduction for a defined problem related to incorrect information or incomplete models associated with diagnosis of the machine using automatically joint optimization of sets of explained observations and required assumptions to determine a relaxed abduction problem,
solving, by a processing unit, the relaxed abduction problem so that the machine is actuated,
wherein the relaxed abduction problem is determined by description logic, and
actuating, by a processing unit, the machine for the diagnosis,
wherein two orders of preference over a subset of the observations and a subset of the assumptions are taken as a basis for determining tuples, so that the theory together with the subset of the assumptions explains the subset of the observations;
wherein the relaxed abduction problem is solved by transforming the relaxed abduction problem into a hypergraph, so that tuples (A,O) are encoded by pareto-optimal paths in the hypergraph;
wherein hyperedges of the hypergraph are induced by transcriptions of prescribed rules; and
wherein a weighted hypergraph $H_{RAP}=(V,E)$, which is induced by the relaxed abduction problem, is determined by $$V = \{(A \sqsubseteq B), (A \sqsubseteq \exists r \cdot B) \mid A, B \in N_C^T, r \in N_R\},$$

wherein $$V_T = \{(A \sqsubseteq A), (A \sqsubseteq T) \mid A \in N_C^T\} \subseteq V$$

denotes a set of final states and E denotes a set of the hyperedges $$e = (T(e), h(e), w(e)),$$

so that the following holds: there is an axiom $a \in T \cup A$ that justifies the derivation $h(e) \in V$ from $T(e) \subseteq V$ on the basis of one of the prescribed rules, wherein the edge weight $w(e)$ is determined according to $$A = \begin{cases} \{a\} & \text{if } a \in A, \\ \emptyset & \text{otherwise} \end{cases}$$

$$O = \begin{cases} \{h(e)\} & \text{if } h(e) \in O, \\ \emptyset & \text{otherwise} \end{cases}.$$

2. The method as claimed in claim 1, wherein the machine comprises a turbine, a gas turbine or a steam turbine.

3. The method as claimed in claim 1, wherein the relaxed abduction problem (RAP) determined to be RAP=(T, A, O, $\leq_A$, $\leq_O$),
wherein
the theory T,
a set of abducible axioms A,
a set O of observations,
with
T|≠O and
the orders of preference
$\leq_A \subseteq P(A) \times P(A)$ and
$\leq_O \subseteq P(O) \times P(O)$
are taken as a basis for determining $\leq$-minimal tuples (A,O)$\in P(A) \times P(O)$, so that $T \cup A$ is consistent and $T \cup A | = O$ holds.

4. The method as claimed in claim 1, wherein the pareto-optimal paths are determined by a label approach.

5. The method as claimed in claim 1, wherein the prescribed rules are determined as follows:

$$\frac{A \sqsubseteq A_1}{A \sqsubseteq B}[A_1 \sqsubseteq B \in \mathcal{T}] \tag{CR1}$$

$$\frac{A \sqsubseteq A_1 \quad A \sqsubseteq A_2}{A \sqsubseteq B}[A_1 \sqcap A_2 \sqsubseteq B \in \mathcal{T}] \tag{CR2}$$

$$\frac{A \sqsubseteq A_1}{A \sqsubseteq \exists r \cdot B}[A_1 \sqsubseteq \exists r \cdot B \in \mathcal{T}] \tag{CR3}$$

$$\frac{A \sqsubseteq \exists r \cdot A_1 \quad A_1 \sqsubseteq A_2}{A \sqsubseteq B}[\exists r \cdot A_2 \sqsubseteq B \in \mathcal{T}] \tag{CR4}$$

$$\frac{A \sqsubseteq \exists r_2 \cdot B}{A \sqsubseteq \exists s \cdot B}[r_2 \sqsubseteq s \in \mathcal{T}] \tag{CR5}$$

$$\frac{A \sqsubseteq \exists r_1 \cdot A_1 \quad A_1 \sqsubseteq \exists r_2 \cdot B}{A \sqsubseteq \exists s \cdot B}[r_1 \circ r_2 \sqsubseteq s \in \mathcal{T}]. \tag{CR6}$$

6. The method as claimed in claim 1, wherein $$PK_d = \{V_{x1}, E_{X2}\}$$

is determined as a hyperpath in H=(V,E) from X to t if
(1) t∈X and $p_{X,t}=(\{t\},\emptyset)$ or
(2) there is an edge e∈E, so that $$h(e) = t, T(e) = \{y_1, \ldots, y_k\}$$

holds.

7. The method as claimed in claim 6, wherein shortest hyperpaths are determined by taking account of two preferences.

8. The method as claimed in claim 7, wherein the shortest hyperpaths are determined by taking account of two preferences by a label correction algorithm.

9. The method as claimed in claim 8, wherein the labels encode pareto-optimal paths to the hitherto found nodes of the hypergraph.

10. The method as claimed in claim 9, wherein alterations along the hyperedges are propagated by means of a meet operator and/or by means of a join operator.

11. An apparatus for actuating a machine, comprising:
a processing unit adapted to
determine a solution using relaxed abduction for a problem related to incorrect information or incomplete models associated with diagnosis of the machine using automatically joint optimization of sets of explained observations and required assumptions to determine a relaxed abduction problem,
solve the relaxed abduction problem so that the machine can be actuated, wherein the relaxed abduction problem is determined by description logic, and
actuate the machine for the diagnosis,
wherein two orders of preference over a subset of observations and a subset of assumptions are taken as a basis for determining tuples, so that a theory together with the subset of the assumptions explains the subset of the observations;
wherein the relaxed abduction problem is solved by transforming the relaxed abduction problem into a hypergraph, so that tuples (A,O) are encoded by pareto-optimal paths in the hypergraph;
wherein hyperedges of the hypergraph are induced by transcriptions of prescribed rules; and
wherein a weighted hypergraph $H_{RAP}$=(V,E), which is induced by the relaxed abduction problem, is determined by $$V = \{(A \sqsubseteq B), (A \sqsubseteq \exists r \cdot B) \mid A, B \in N_C^T, r \in N_R\},$$

wherein $$V_T = \{(A \sqsubseteq A), (A \sqsubseteq T) \mid A \in N_C^T\} \subseteq V$$

denotes a set of final states and E denotes a set of the hyperedges
e=(T(e), h(e), w(e)),
so that the following holds: there is an axiom a∈T∪A that justifies the derivation h(e)∈V from T(e)⊆V on the basis of one of the prescribed rules, wherein the edge weight w(e) is determined according to $$A = \begin{cases} \{a\} & \text{if } a \in A, \\ \phi & \text{otherwise} \end{cases}$$

$$O = \begin{cases} \{h(e)\} & \text{if } h(e) \in O, \\ \phi & \text{otherwise} \end{cases}.$$

12. The apparatus as claimed in claim 11, wherein the machine comprises a turbine, a gas turbine or a steam turbine.

* * * * *